United States Patent [19]

Marechal

[11] 4,031,773
[45] June 28, 1977

[54] DEVICE FOR ACTUATING A SHEATHED CONTROL CABLE

[75] Inventor: Robert René Marechal, Paris, France

[73] Assignee: SICMA - Societe Industrielle et Commerciale de Materiel Aeronautique, Issoudun, France

[22] Filed: July 14, 1976

[21] Appl. No.: 705,108

[30] Foreign Application Priority Data

Feb. 13, 1976 France .............................. 76.04672

[52] U.S. Cl. ......................................... 74/501.5 R
[51] Int. Cl.² ........................................... F16C 1/22
[58] Field of Search ............ 74/501 R, 501.5, 99 A; 191/44

[56] References Cited
UNITED STATES PATENTS

| 444,006 | 1/1891 | Mason | 74/501.5 X |
| 3,223,201 | 12/1965 | Waner | 74/501 UX |

FOREIGN PATENTS OR APPLICATIONS

| 314,616 | 7/1929 | United Kingdom | 74/501.5 |

Primary Examiner—Clarence R. Gordon
Attorney, Agent, or Firm—Karl F. Ross; Herbert Dubno

[57] ABSTRACT

A device for actuating a sheathed control cable comprises a push button which is movable to apply a tension to the cable. An inclined surface rigid with the push button engages, via a ball, a traction member anchored to the cable. When the button is depressed the inclined surface displaces the traction member via the ball whereby the cable is tensioned. The ball rolls along the inclined surface during this movement whereby such movement occurs substantially without friction.

8 Claims, 3 Drawing Figures

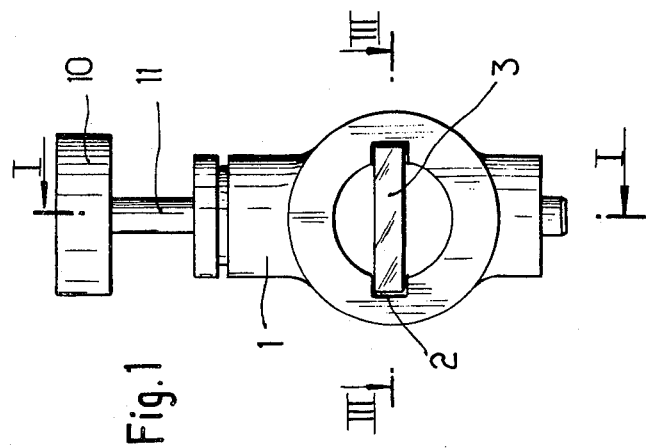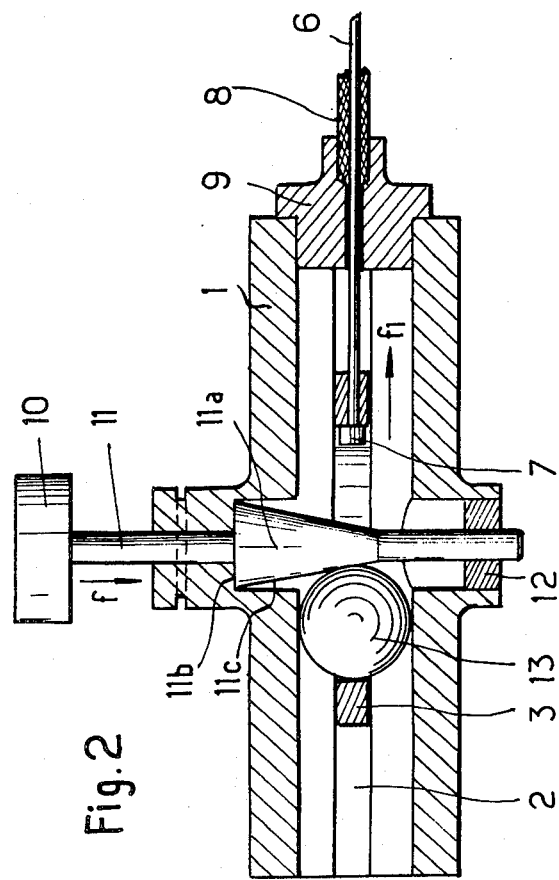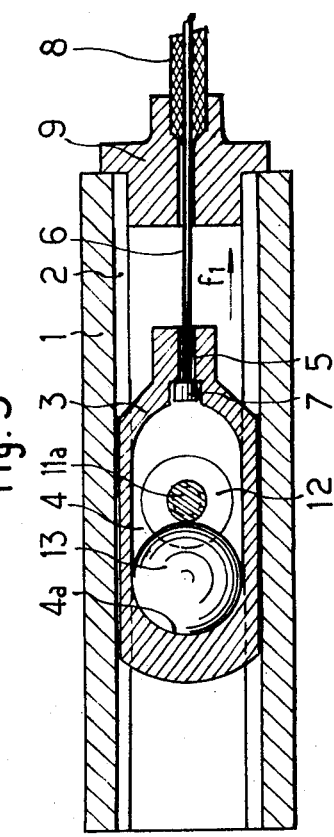

DEVICE FOR ACTUATING A SHEATHED CONTROL CABLE

BACKGROUND OF THE INVENTION

1. Field of the Invention.

The invention relates to a device for actuating a sheathed control cable.

2. Description of the prior Art.

Sheathed control cables, which are sometimes referred to as "Bowden cables" are used for numerous purposes, for example for releasing the backs of seats comprising an inclinable back, or for releasing a unit which is pivotally movable and is held by a lock in a selected position. It has been proposed to actuate such a cable using a device which comprises a push button adapted to exert a tensile force on the cable, and the cable, in turn, actuates a movable control member.

An object of the invention is to provide such a control device in which the push button has very great flexibility in operation.

SUMMARY OF THE INVENTION

According to the invention, there is provided a device for actuating a sheathed control cable, said device comprising a casing, push button means actuable to exert a tension on the cable, said push button means being slidable in the casing, means defining an inclined surface rigid with the push button means, a traction member slidably mounted in the casing, the cable being fixed to the traction member, and ball means interposed between the inclined surface and the traction member.

BRIEF DESCRIPTION OF THE DRAWINGS

An embodiment of the invention will now be described, by way of example only, with reference to the accompanying diagrammatic drawings, in which:

FIG. 1 is an end elevation of an actuating device in accordance with the invention;

FIG. 2 is a section taken on line I—I of FIG. 1; and

FIG. 3 is a section taken on line III—III of FIG. 1.

DESCRIPTION OF THE PREFERRED EMBODIMENT

As shown in the drawing, the device comprises a cylindrical casing 1 provided with two internal grooves 2 diametrically opposite one another. A traction member 3 slidable in these grooves is provided with an internal cavity, as indicated at 4, and has a longitudinal slot 5 leading into the cavity 4. A cable 6 extends through the slot 5 and the head 7 of this cable is accommodated in the cavity 4. The cable 6 is disposed in a sheath 8 which bears against an abutment 9 closing one of the ends of the casing 1.

A control push button 10 is fixed to a control element 11 which extends through the cavity 4 of the traction member 3, the lower end portion of the control element 11 being slidably mounted in a guide plug 12 for movement perpendicularly to the direction of displacement of the traction member 3.

The element 11 comprises a frustoconical part 11a, and a ball 12 is accommodated in the cavity 4, between the frustoconical part 11a and the adjacent edge 4a of the cavity 4. To ensure satisfactory guiding of the ball 13, the width of the cavity 4 is substantially equal to the diameter of the ball, and the end edge 4a of the cavity is of part-cylindrical form with a radius equal to that of the ball 13.

The cable is connected to a device to be controlled which in the usual way comprises a return spring. This spring exerts a tension on the cable 6 and thus tends to displace the traction member in the direction of the arrow $f_1$. By reason of this, the ball 13 is gripped between the frustoconical part 11a of the control element 11 and the part-cylindrical edge 4a of the cavity 4, and the ball 13 thus tends to displace the control element 11 and its push button 10 upwards; this movement is limited by a shoulder 11b of the control element 11 coming into contact with the inside wall of the casing 1.

To actuate the device, it is only necessary to press the push button 10, as indicated by the arrow $f_2$. The control element 11 is guided by the plug 12 and therefore cannot be displaced laterally. The frustoconical part 11a of the element 11 acts, via the ball 13, to retract the traction member 3 in the direction opposite to that of the arrow $f_1$; the traction member 3 therefore exerts a tension on the cable 6, whereby the device is actuated.

When the element 11 is displaced, the ball 13 rolls on the frustoconical part 11a so that there is practically no friction and the force to be exerted on the push button 10 is in fact only the force necessary for actuating the device.

When the push button 10 is released, the spring of the device returns the push button upwards until the shoulder 11b abuts against the wall of the casing 1.

In a modified form of the device, the frustoconical part 11a can be replaced by a part with a rectangular section comprising an oblique flat ramp in contact with the ball 13.

I claim:

1. A device for actuating a sheathed control cable, said device comprising a casing, push button means actuable to exert a tension on the cable, said push button means being slidable in the casing, means defining an inclined surface rigid with the push button means, a traction member slidably mounted in the casing, the cable being fixed to the traction member, and ball means interposed between the inclined surface and the traction member.

2. A device according to claim 1, further comprising a control element having an end portion, said casing having means defining a guide opening, said end portion of the control element extending through the guide opening, and said inclined surface being a part of the control element.

3. A device according to claim 2, wherein the control element comprises a shoulder, and the casing comprises an inner abutment surface, the shoulder contacting said abutment surface in the inoperative state of the device.

4. A device according to claim 1, further comprising a control element having a shoulder, said inclined surface being a part of the control element and the casing having an inner abutment surface, the shoulder contacting said abutment surface in the inoperative state of the device.

5. A device according to claim 1, wherein the push button means is movable in a direction perpendicular to the direction of displacement of the traction member.

6. A device according to claim 1, wherein the traction member comprises a cavity through which said inclined surface extends and in which the ball means is engaged.

7. A device according to claim 6, wherein said cavity has a part-cylindrical edge in contact with the ball means, and the radius of said part-cylindrical edge is equal to the radius of the ball means.

8. A device according to claim 1, further comprising a frustoconical part rigid with the push button means, said frustoconical part defining said inclined surface.

* * * * *